US012511289B2

(12) United States Patent
Tang et al.

(10) Patent No.: US 12,511,289 B2
(45) Date of Patent: Dec. 30, 2025

(54) PLAN EXECUTION METHOD, APPARATUS, AND SYSTEM FOR DISTRIBUTED DATABASE

(71) Applicant: BEIJING OCEANBASE TECHNOLOGY CO., LTD., Beijing (CN)

(72) Inventors: Mingdou Tang, Hangzhou (CN); Yi Pan, Hangzhou (CN); Tao Zhu, Hangzhou (CN); Huang Yu, Hangzhou (CN)

(73) Assignee: Beijing Oceanbase Technology Co., Ltd., Beijing (CN)

( * ) Notice: Subject to any disclaimer, the term of this patent is extended or adjusted under 35 U.S.C. 154(b) by 0 days.

(21) Appl. No.: 18/866,909

(22) PCT Filed: May 9, 2023

(86) PCT No.: PCT/CN2023/092952
§ 371 (c)(1),
(2) Date: Nov. 18, 2024

(87) PCT Pub. No.: WO2023/221813
PCT Pub. Date: Nov. 23, 2023

(65) Prior Publication Data
US 2025/0355871 A1    Nov. 20, 2025

(30) Foreign Application Priority Data
May 19, 2022    (CN) .................. 202210554683.X

(51) Int. Cl.
*G06F 16/00*    (2019.01)
*G06F 16/2453*    (2019.01)
*G06F 16/27*    (2019.01)

(52) U.S. Cl.
CPC .. *G06F 16/24542* (2019.01); *G06F 16/24532* (2019.01); *G06F 16/27* (2019.01)

(58) Field of Classification Search
CPC ......... G06F 16/24542; G06F 16/24532; G06F 16/27
See application file for complete search history.

(56) References Cited

U.S. PATENT DOCUMENTS

| 5,574,900 A | 11/1996 | Huang et al. |
| 11,615,092 B1 * | 3/2023 | Breß ................ G06F 16/27 707/718 |
| 11,914,590 B1 * | 2/2024 | Plenderleith ...... G06F 16/24552 |

FOREIGN PATENT DOCUMENTS

| CN | 107329814 A | 11/2017 |
| CN | 111858610 A | 10/2020 |

(Continued)

OTHER PUBLICATIONS

"International Search Report" regarding Intl. Application No. PCT/CN2023/092952, mailed on Aug. 18, 2023, pp. 1-9.

*Primary Examiner* — Alexander Khong
(74) *Attorney, Agent, or Firm* — Womble Bond Dickinson (US) LLP

(57) ABSTRACT

A plan execution method, apparatus, and system for a distributed database are provided. The plan execution method is performed by a first execution thread on a plan execution node. Feedback data returned by a child logical subplan of a current logical subplan is received in parallel with at least one second execution thread scheduled to execute the current logical subplan. Whether the current logical subplan includes an execution operator related to a row number generation operation is determined. In response to that the current logical subplan includes the execution operator related to a row number generation operation, the received data are cached, and a row number start value (Continued)

obtaining request is sent to the scheduling node. Data row numbers are generated for the cached data based on a received row number start value.

16 Claims, 12 Drawing Sheets

(56) References Cited

FOREIGN PATENT DOCUMENTS

| | | | | |
|---|---|---|---|---|
| CN | 112182028 A | * | 1/2021 | ......... G06F 16/2453 |
| CN | 114365115 A | * | 4/2022 | ....... G06F 16/24553 |
| CN | 114996299 A | | 9/2022 | |
| WO | WO-2019109879 A1 | * | 6/2019 | ........... G06F 16/258 |

* cited by examiner

```
create table t1(v1, int, v2,int);
create table t2(v1,int, v2,int);
insert /*+parallel(64) enable_parallel_dml*/ into t2;
Select v1, rownum from t1;
```

| ID | OPERATOR | NAME | EST. ROWS | COST |
|---|---|---|---|---|
| 0 | PX COORDINATOR | | 100000 | 86322 |
| 1 | EXCHANGE OUT DISTR | :EX10002 | 100000 | 86322 |
| 2 | INSERT | | 100000 | 86322 |
| 3 | EXCHANGE IN DISTR | | 100000 | 84819 |
| 4 | EXCHANGE OUT DISTR (HASH) | :EX10001 | 100000 | 62487 |
| 5 | MATERIAL | | 100000 | 62487 |
| 6 | SUBPLAN SCAN | VIEW1 | 100000 | 59366 |
| 7 | COUNT | | 100000 | 57863 |
| 8 | EXCHANGE IN DISTR | | 100000 | 59360 |
| 9 | EXCHANGE OUT DISTR | :EX10000 | 100000 | 38681 |
| 10 | PX BLOCK ITERATOR | | 100000 | 38681 |
| 11 | TABLE SCAN | T1 | 100000 | 38681 |

FIG. 3

PLAN EXECUTION METHOD, APPARATUS, AND SYSTEM FOR DISTRIBUTED DATABASE

CROSS-RELATED APPLICATIONS

This specification is a national stage entry of international application no. PCT/CN2023/092952, filed May 9, 2023, which claims priority to Chinese Patent Application No. 202210554683.X, filed with the China National Intellectual Property Administration on May 19, 2022, which is incorporated herein by reference in its entirety.

TECHNICAL FIELD

Embodiments of this specification generally relate to the database field, and in particular, to a plan execution method, a plan execution apparatus, a data query method, a data query engine for a distributed database, and a distributed database.

BACKGROUND

A distributed database includes a plurality of distributed storage nodes. Each distributed storage node includes a data query engine and a data storage engine. The distributed database is usually of a share nothing architecture, for example, an OceanBase database. In the distributed database, data are stored in all data storage engines in a distributed manner.

When a data query is performed in the distributed database, after the distributed storage node receives a data query statement, the distributed storage node generates a distributed execution plan based on the received data query statement. Each distributed execution plan is managed by a PX operator, the distributed execution plan managed by the PX operator is transformed into a plurality of distributed logical subplans (DFOs), and the plurality of DFOs are formed into a tree structure. Each of the plurality of DFOs is successively scheduled by the PX operator to the plurality of distributed data storage nodes in a specific logical sequence, and the plurality of distributed storage nodes enable a plurality of execution threads to perform parallel execution. In this way, the data query is implemented.

However, in some application scenarios of the distributed database, the DFO performed in parallel includes an execution operator, for example, a COUNT operator and a SUM operator, related to an operation that data row numbers need to be generated for used data. For example, when semantics of the data query statement (for example, an SQL statement) requires a row number, an optimizer chooses to create the row number in an execution process of a proper execution operator, for example, to create the row number in an execution process of the COUNT operator. In the distributed database, a data row number generation operation is usually implemented based on a ROWNUM function. Semantics of the ROWNUM function determines that generated data row numbers need to be continuously unique and progressively increasing. If the DFO includes the execution operator related to the operation that the data row numbers need to be generated for the used data, the data row numbers need to be generated for the used data in an execution process of the DFO, and it needs to be ensured that the generated data row numbers need to be progressively increasing, so that the data row number generation operation becomes a single-point operation. The term "single-point operation" is calculation operations that are sequentially performed by a single thread and cannot be concurrently performed. In the distributed database, the corresponding DFO cannot be executed in parallel due to the single-point operation. Consequently, parallel execution performance of the distributed database is severely affected.

SUMMARY

In view of the above-mentioned descriptions, embodiments of this specification provide a plan execution method, a plan execution apparatus, a data query method, and a data query engine for a distributed database, and a distributed database. According to the plan execution method and the plan execution apparatus, in a plan execution process, once a DFO of an operation that data row numbers need to be generated for used data is encountered, a plurality of execution threads that perform the DFO in parallel send a row number start value obtaining request to a scheduling node, the scheduling node allocates different row number start values to all the execution threads, and all the execution threads generate data row numbers for locally received data based on the allocated row number start values, and then perform the DFO in parallel based on the data for which the data row numbers are generated. In this way, parallel execution performance of the distributed database is improved.

According to an aspect of the embodiments of this specification, a logical subplan execution method for a distributed database is provided. The method is performed by a first execution thread on a plan execution node, and the method includes: receiving, in parallel with at least one second execution thread scheduled to execute a current logical subplan, feedback data returned by a child logical subplan of the current logical subplan; determining whether the current logical subplan includes an execution operator related to a row number generation operation; in response to that the current logical subplan includes the execution operator related to the row number generation operation, caching the received data, and sending a row number start value obtaining request to a scheduling node, where the row number start value obtaining request includes a quantity of rows of cached data; generating data row numbers for the cached data based on a row number start value received from the scheduling node, where the row number start value is allocated by the scheduling node to the first execution thread in response to the row number start value obtaining request; and executing, in parallel with the second execution thread, the current logical subplan based on the respectively received data for which the data row numbers are generated; and sending, as feedback data in parallel with the second execution thread, an execution result of the current logical subplan to an execution thread scheduled to execute a parent logical subplan of the current logical subplan.

Optionally, in an example of the above-mentioned aspect, the method can further include: executing the current logical subplan in parallel with the second execution thread based on the respectively received data in response to that the current logical subplan does not include the execution operator related to the row number generation operation.

Optionally, in an example of the above-mentioned aspect, the determining whether the current logical subplan includes an execution operator related to a row number generation operation can include: traversing execution operators in the current logical subplan, to determine whether the current logical subplan includes the execution operator related to the row number generation operation.

Optionally, in an example of the above-mentioned aspect, the scheduling node allocates progressively increasing row number start values to the first execution thread and all the second execution threads based on the quantity of rows of cached data in the row number start value obtaining request received from the first execution thread and the second execution thread.

Optionally, in an example of the above-mentioned aspect, the second execution thread includes an execution thread located on the same plan execution node as the first execution thread and/or an execution thread located on a different plan execution node from the first execution thread.

Optionally, in an example of the above-mentioned aspect, a quantity of execution threads on each plan execution node is determined based on a data correlation between data stored on the plan execution node and the current logical subplan and an idle thread resource on the plan execution node.

According to another aspect of the embodiments of this specification, a data query method for a distributed database is provided, including: receiving a data query statement provided by a user; generating a distributed execution plan based on the received data query statement; logically transforming the distributed execution plan, to obtain a plurality of distributed logical subplans, where the plurality of distributed logical subplans are formed into a tree structure; successively scheduling the plurality of distributed logical subplans to corresponding distributed data storage nodes in a scheduling sequence, to perform parallel execution in the method described above; and providing an execution result of a top-level distributed logical subplan for the user as a data query result.

Optionally, in an example of the above-mentioned aspect, the scheduling sequence of the distributed logical subplans is determined based on a tree structure of the distributed logical subplans.

According to another aspect of the embodiments of this specification, a logical subplan execution apparatus for a distributed database is provided. The distributed database includes a plurality of distributed storage nodes, the apparatus is applied to serve as a first distributed storage node of a plan execution node, and the apparatus includes: a data receiving unit, configured to receive, in parallel through a first execution thread on the first distributed storage node with at least one second execution thread scheduled to execute a current logical subplan, feedback data returned by a child logical subplan of the current logical subplan; a plan determining unit, configured to determine, through the first execution thread, whether the current logical subplan includes an execution operator related to a row number generation operation; a plan execution unit, configured to: in response to that the current logical subplan includes the execution operator related to the row number generation operation, through the first execution thread, cache the received data, and send a row number start value obtaining request to a scheduling node, where the row number start value obtaining request includes a quantity of rows of cached data; generate data row numbers for the cached data based on a row number start value received from the scheduling node, where the row number start value is allocated by the scheduling node to the first execution thread in response to the row number start value obtaining request; and execute, in parallel with the second execution thread, the current logical subplan based on the respectively received data for which the data row numbers are generated; and a data sending unit, configured to send, as feedback data in parallel through the first execution thread with the second execution thread, an execution result of the current logical subplan to an execution thread scheduled to execute a parent logical subplan of the current logical subplan.

Optionally, in an example of the above-mentioned aspect, the plan execution unit executes the current logical subplan in parallel through the first execution thread with the second execution thread based on the respectively received data in response to that the current logical subplan does not include the execution operator related to the row number generation operation.

Optionally, in an example of the above-mentioned aspect, the plan execution unit includes: a data caching module, configured to cache the received data through the first execution thread in response to that the current logical subplan includes the execution operator related to the row number generation operation; a request sending module, configured to send the row number start value obtaining request to the scheduling node through the first execution thread; a row number start value receiving module, configured to receive the row number start value from the scheduling node through the first execution thread; a row number generation module, configured to generate the data row numbers for the cached data based on the received row number start value through the first execution thread; and a plan execution module, configured to execute, in parallel through the first execution thread with the second execution thread, the current logical subplan based on the respectively received data for which the data row numbers are generated.

Optionally, in an example of the above-mentioned aspect, the plan determining unit traverses execution operators in the current logical subplan, to determine whether the current logical subplan includes the execution operator related to the row number generation operation.

Optionally, in an example of the above-mentioned aspect, the row number start values corresponding to data in the first execution thread and all the second execution threads are allocated by the scheduling node based on the quantity of rows of cached data in the row number start value obtaining request received from the first execution thread and the second execution thread, and row number start values received by the first execution thread and all the second execution threads are progressively increasing.

According to another aspect of the embodiments of this specification, a data query engine configured to perform a data query in a distributed database is provided. The distributed database includes a plurality of distributed data storage nodes, each distributed data storage node includes a data query engine and a data storage engine, and the data query engine includes: a query statement receiving apparatus, configured to receive a data query statement provided by a user; a plan generation apparatus, configured to generate a distributed execution plan based on the received data query statement; a plan transformation apparatus, configured to logically transform the distributed execution plan, to obtain a plurality of distributed logical subplans, where the plurality of distributed logical subplans are formed into a tree structure; a plan scheduling apparatus, configured to successively schedule the plurality of distributed logical subplans to corresponding distributed data storage nodes in a scheduling sequence; the plan execution apparatus described above; and a query result provision apparatus, configured to provide an execution result of a top-level distributed logical subplan for the user as a data query result.

According to another aspect of the embodiments of this specification, a distributed database is provided, including at least two distributed storage nodes. Each storage node includes a data storage engine and the data query engine described above.

According to another aspect of the embodiments of this specification, a plan execution apparatus applied to a distributed database is provided, including: at least one processor; a storage coupled to the at least one processor; and a computer program stored in the storage, where the at least one processor executes a computer program to implement the plan execution method described above.

According to another aspect of the embodiments of this specification, a data query engine applied to a distributed database is provided, including: at least one processor; a storage coupled to the at least one processor; and a computer program stored in the storage, where the at least one processor executes a computer program to implement the data query method described above.

According to another aspect of the embodiments of this specification, a non-transitory computer-readable storage medium is provided. The non-transitory computer-readable storage medium stores executable instructions, and when the instructions are executed, a processor is enabled to perform the plan execution method described above or perform the data query method described above.

According to another aspect of the embodiments of this specification, a computer program product is provided, including a computer program. The computer program is executed by a processor, to implement the plan execution method described above or perform the data query method described above.

BRIEF DESCRIPTION OF DRAWINGS

The essence and advantages of the content of this specification can be further understood with reference to the following accompanying drawings. In the accompanying drawings, similar components or features can have the same reference numerals.

FIG. 3 is an example schematic diagram illustrating a distributed execution plan;

DESCRIPTION OF EMBODIMENTS

The subject matter described here is discussed below with reference to example implementations. It should be understood that these implementations are merely discussed to enable a person skilled in the art to better understand and implement the subject matter described in this specification, and are not intended to limit the protection scope, applicability, or examples described in the claims. The functions and arrangements of the elements under discussion can be changed without departing from the protection scope of the content of this specification. Various processes or components can be omitted, replaced, or added in the examples based on needs. For example, the described method can be performed in a sequence different from the described sequence, and steps can be added, omitted, or combined. In addition, features described relative to some examples can be combined in other examples.

As used in this specification, the term "including" and variants thereof represent open terms, and mean "including but not limited to". The term "based on" means "at least partially based on". The terms "one embodiment" and "an embodiment" mean "at least one embodiment". The term "another embodiment" indicates "at least one other embodiment". The terms "first", "second", etc. can refer to different objects or the same object. Other definitions, whether explicit or implicit, can be included below. Unless explicitly stated in the context, the definition of a term is consistent throughout this specification.

Figure 1:
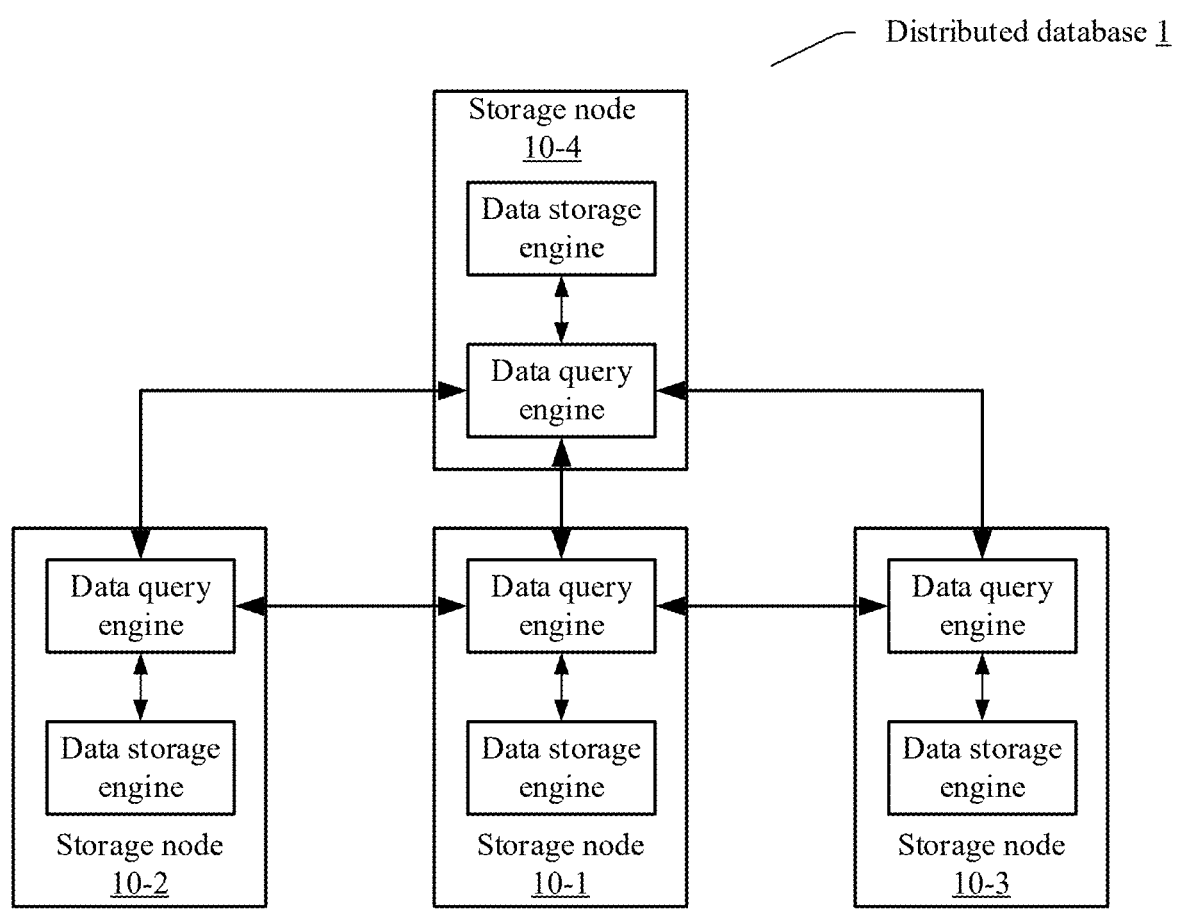
FIG. 1 is an example schematic diagram illustrating a distributed database.

FIG. 1 is an example schematic diagram illustrating a distributed database 1. As shown in FIG. 1, the distributed database 1 includes a plurality of storage nodes 10-1 to 10-4. The storage nodes 10-1 to 10-4 are distributed storage nodes, and each storage node includes a data query engine and a data storage engine. It should be noted that the example shown in FIG. 1 is merely an example. In another embodiment, the distributed database 1 can include more or fewer storage nodes.

For example, the distributed database 1 can be of a share nothing architecture, for example, an OceanBase database. In the distributed database, data are stored in storage engines on the storage nodes in a distributed manner. For example, the data can be partitioned into a plurality of data partitions (also referred to as data blocks), and the data partitions obtained through partitioning are separately stored in different storage engines. Each storage engine can store one or more data partitions. CPU resources and IO resources required for data access related to each storage node locally exist, and data is performed by a data query engine on the storage node.

During a data query, one storage node in the distributed database serves as a scheduling node of a distributed execution plan. After a data query engine on the scheduling node receives a data query statement and generates the distributed execution plan, the distributed execution plan is logically transformed into a plurality of logical subplans (for example, is logically transformed based on semantics). In this specification, the logical subplan can be referred to as a data flow operation (DFO). After a transformation into the DFO is completed, the data query engine on the scheduling node schedules the generated DFO to a plurality of storage nodes (namely, plan execution nodes) in parallel, and each plan execution node enables one or more execution threads to perform the scheduled DFO in parallel.

Figure 2:
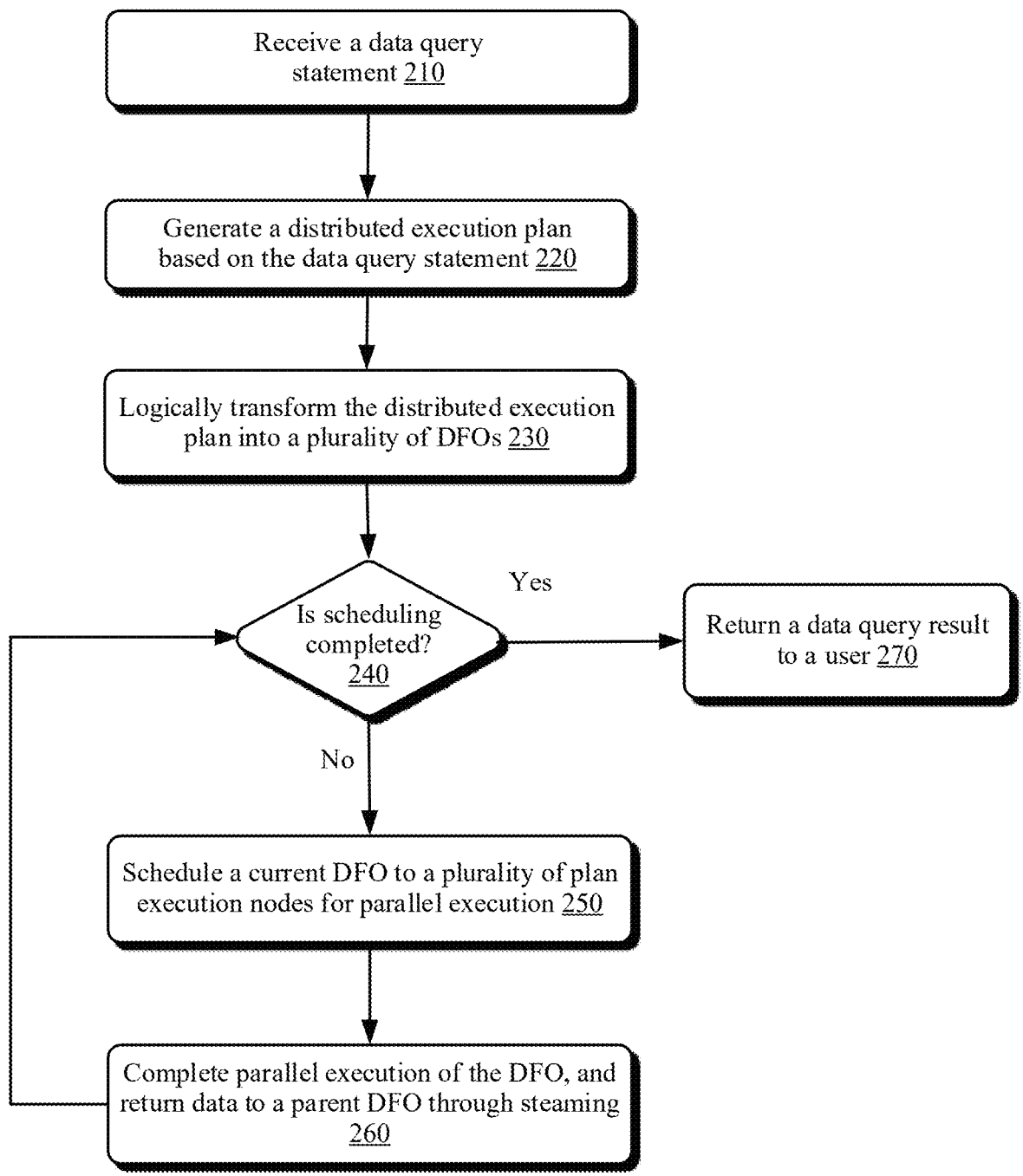
FIG. 2 is an example flowchart illustrating a data query process of a distributed database, according to an embodiment of this specification.

FIG. 2 is an example flowchart illustrating a data query process 200 of a distributed database, according to an embodiment of this specification.

During a data query, as shown in FIG. 2, in 210, a data query statement entered by a user is received through a data query engine on a storage node connected to the user. In an example, the data query statement entered by the user can be received through an input interface, an input unit, or an input apparatus of the data query engine. For example, the data query statement entered by the user can be received through an input box in a client interface of the data query engine. For example, the data query can be, for example, an SQL query, and the data query statement can include an SQL statement. For example, the received SQL statement can be, for example, "select t2.a, t2.b, (select sum (c) from t5 where t1.b=t5.a) as sum from t1, t2, t3, t4 where t1.a=1 and t1.b=t2.a and t1.b-t3.a and t1.b=t4.a".

In 220, a distributed execution plan is generated based on the received data query statement through a data query engine on a scheduling node. For example, the scheduling node can generate the distributed execution plan based on the received data query statement through an optimizer in the data query engine. The distributed execution plan can include, for example, an SQL execution plan, and the SQL execution plan has a tree structure including a plurality of SQL operators. The SQL operator is a basic constitutional unit that forms the SQL execution plan, and is used to describe a basic operation corresponding to specific SQL semantics, for example, a TABLE SCAN operator, a TABLE INSERT operator, a TABLE UPDATE operator, a TABLE DELETE operator, a JOIN operator, a GROUP BY operator, an ORDER BY operator, or an EXCHANGE operator. Correspondingly, the optimizer can be an SQL optimizer. FIG. 3 is an example schematic diagram illustrating an SQL execution plan for the SQL statement described above. In an example, the storage node connected to the user can serve as the scheduling node. In another example, the scheduling node can alternatively be another storage node. In this case, the storage node connected to the user needs to send the received data query statement to the scheduling node.

In 230, the distributed execution plan is logically transformed into a plurality of DFOs through the data query engine on the scheduling node. For example, the SQL execution plan can be logically transformed into the plurality of DFOs based on the SQL semantics. For the SQL execution plan shown in FIG. 3, an EXCHANGE OUT operator (a sending operator)/EXCHANGE IN operator (a receiving operator) can be used as a boundary to logically transform the SQL execution plan, to obtain three DFOs. Each obtained DFO can include a plurality of operators executed in series, for example, a plurality of SQL operators. For example, one DFO includes a partition scan operator, an aggregation operator, a sending operator, and another DFO includes a collection operator, an aggregation operator, etc. All the SQL operators can be processed in parallel. Specifically, an operator 9 to an operator 11 form a DFO 0, an operator 4 to an operator 8 form a DFO 1, and an operator 1 to an operator 3 form a DFO 2.

The generated DFOs are of a tree structure, and there is a hierarchical relationship between the DFOs. If a DFO processing result of a second DFO needs to be used when a first DFO is performed, the first DFO is referred to as an upper-layer DFO or a parent DFO, and the second DFO is referred to as a lower-layer DFO or a child DFO. After the DFOs are generated, a scheduling sequence of the DFOs can be further generated. The scheduling sequence of the DFOs can be generated based on the tree structure of the DFOs. The scheduling sequence of the DFOs includes a traversal scheduling sequence of the DFOs, namely, a scheduling sequence determined based on a traversal policy. In addition, a degree of parallelism of execution of the DFOs can also be generated based on the tree structure of the DFOs. Here, the term "degree of parallelism of execution" is a quantity of DFOs scheduled in parallel. For the SQL execution plan shown in FIG. 3, the scheduling sequence of DFOs is DFO 0→DFO 1→DFO 2.

FIG. 4A to FIG. 4E are example schematic diagrams illustrating tree structures of distributed logical subplans.

Figure 4A:
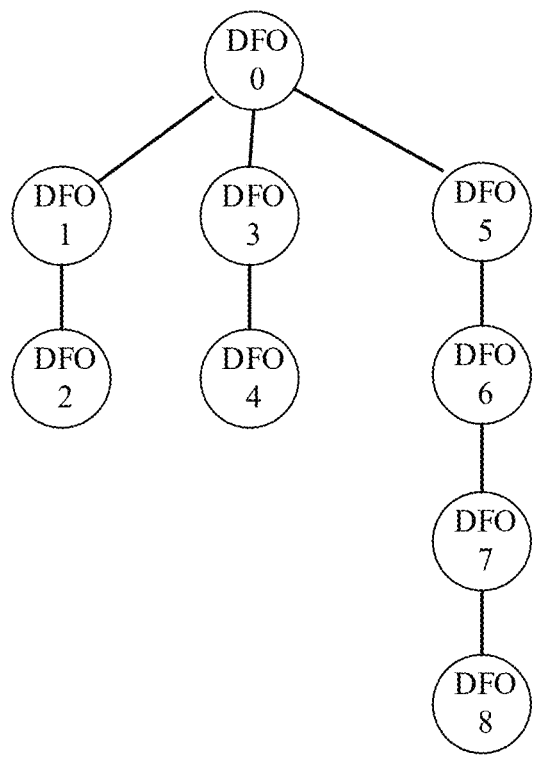
FIG. 4A to FIG. 4E are example schematic diagrams illustrating tree structures of distributed logical subplans.
Figure 4B:
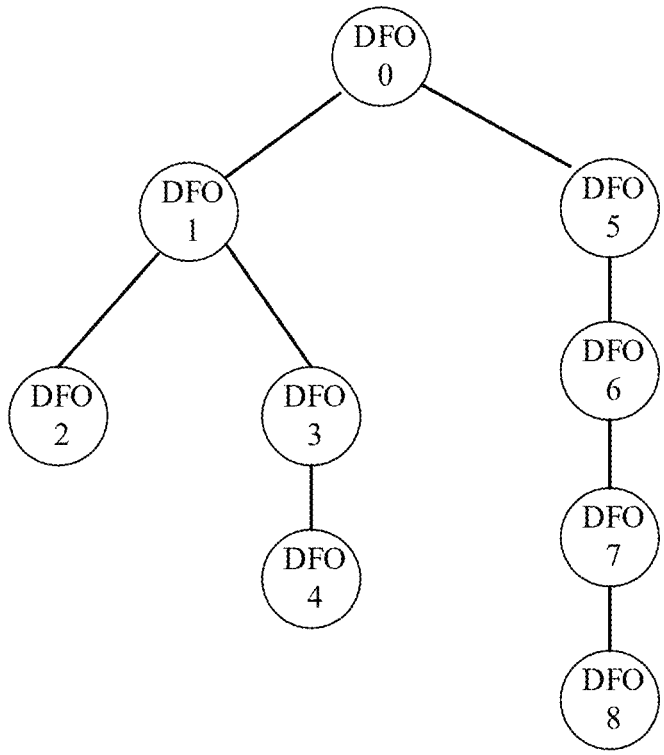
Figure 4C:
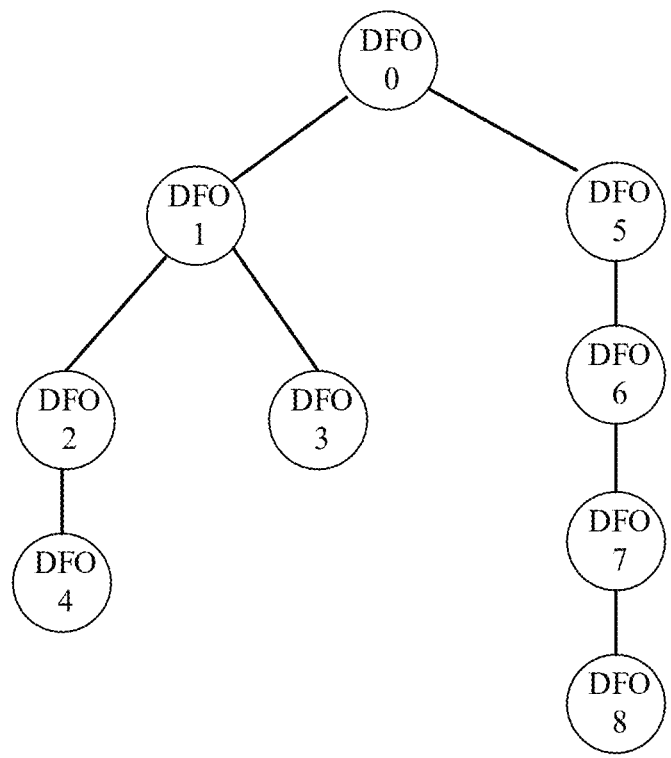
Figure 4D:
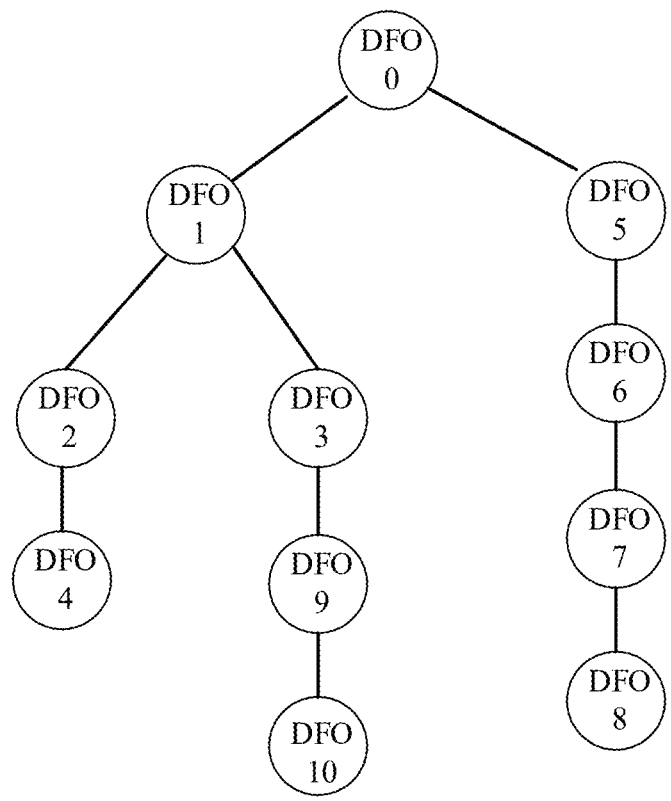
Figure 4E:
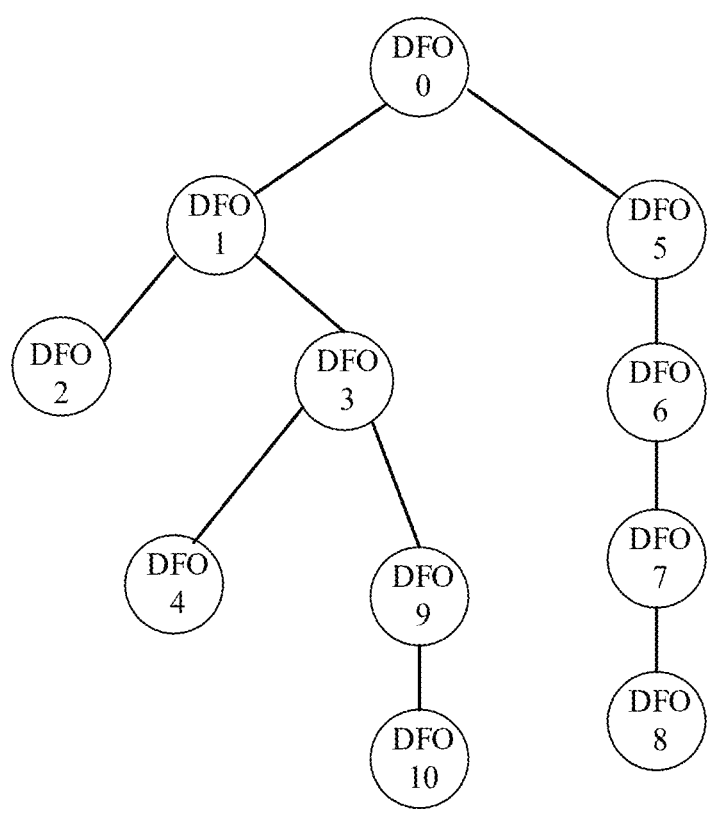

In a tree structure shown in FIG. 4A, the degree of parallelism of execution of the DFOs is 2. In other words, two DFOs are simultaneously performed. The scheduling sequence of the DFOs is DFO 2→DFO 1→DFO 4→DFO 3→DFO 8→DFO 7→DFO 6→DFO 5. In a tree structure shown in FIG. 4B, the degree of parallelism of execution of the DFOs is 2 or 3. In other words, two DFOs or three DFOs are simultaneously performed. The scheduling sequence of the DFOs is DFO 4→DFO 3→DFO 2→DFO 1→DFO 8→DFO 7→DFO 6→DFO 5. In a tree structure shown in FIG. 4C, the degree of parallelism of execution of the DFOs is 2. In other words, two DFOs are simultaneously performed. The scheduling sequence of the DFOs is DFO 4→DFO 2→DFO 1→DFO 3→DFO 8→DFO 7→DFO 6→DFO 5. In a tree structure shown in FIG. 4D, the degree of parallelism of execution of the DFOs is 2 or 3. In other words, two DFOs or three DFOs are simultaneously performed. The scheduling sequence of the DFOs is DFO 4→DFO 2→DFO 1→DFO 10→DFO 9→DFO 3→DFO 8→DFO 7→DFO 6→DFO 5. In a tree structure shown in FIG. 4E, the degree of parallelism of execution of the DFOs is 2 or 3. In other words, two DFOs or three DFOs are simultaneously performed. The scheduling sequence of the DFOs is DFO 10→DFO 9→DFO 3→DFO 4→DFO 2→DFO 1→DFO 8→DFO 7→DFO 6→DFO 5.

Then, 240 to 270 are cyclically performed, until a data query result is output.

Specifically, in each cyclic process, in 240, whether scheduling is completed, namely, whether scheduling processing is completed for all the DFOs is determined. If scheduling processing is completed for all the DFOs, a processing result of a current DFO (namely, a root DFO) is provided for the user as the data query result in 270. If there is still an unscheduled DFO, in 250, the currently unscheduled DFO is scheduled to each plan execution node in the scheduling sequence. A data query engine on each plan execution node performs the received DFO in parallel. A parallel execution process of the DFO of each plan execution node is described below with reference to FIG. 5. Then, in 260, data are fed back to a parent DFO through streaming after each scheduled plan execution node completes parallel processing for the DFO.

After the scheduling node schedules the DFO to each plan execution node, each scheduled plan execution node enables one or more idle threads from a respective idle thread pool to perform the received DFO in parallel. The thread enabled by each plan execution node can be an execution thread. The execution thread enabled by each plan execution node can include one or more threads.

In some embodiments, a quantity of execution threads on each plan execution node can be determined based on a data correlation between data stored on the plan execution node and the current DFO and an idle thread resource on the plan execution node. In this specification, the term "data correlation" is used to indicate whether there is a correlation between data used when the DFO is performed and data stored on the plan execution node, for example, whether the used data are the stored data or whether the used data are obtained based on the stored data. For example, if a degree of parallelism of execution of the DFO is 64, each plan execution node needs to enable a total of 64 threads. In this case, if a plan execution node in a data correlation with the DFO exists in the plan execution nodes, an idle thread in the plan execution node is selected as the execution thread as far as possible. If no plan execution node in a data correlation with the DFO exists in the plan execution nodes, an idle thread can be randomly selected from idle threads on all the plan execution nodes as the execution thread. For example, for a DFO that includes a data scan operator (TABLE SCAN), an idle thread in a storage node in which to-be-scanned data are located is scheduled as far as possible. For a DFO that does not include a data scan operator, enough idle threads can be randomly selected as the execution thread. In addition, in some embodiments, workload balancing of all the plan execution nodes can be further considered when the execution thread is selected. In other words, after the execution thread is enabled, workload of the plan execution nodes in the distributed database is maintained load-balanced as far as possible.

Figure 5:
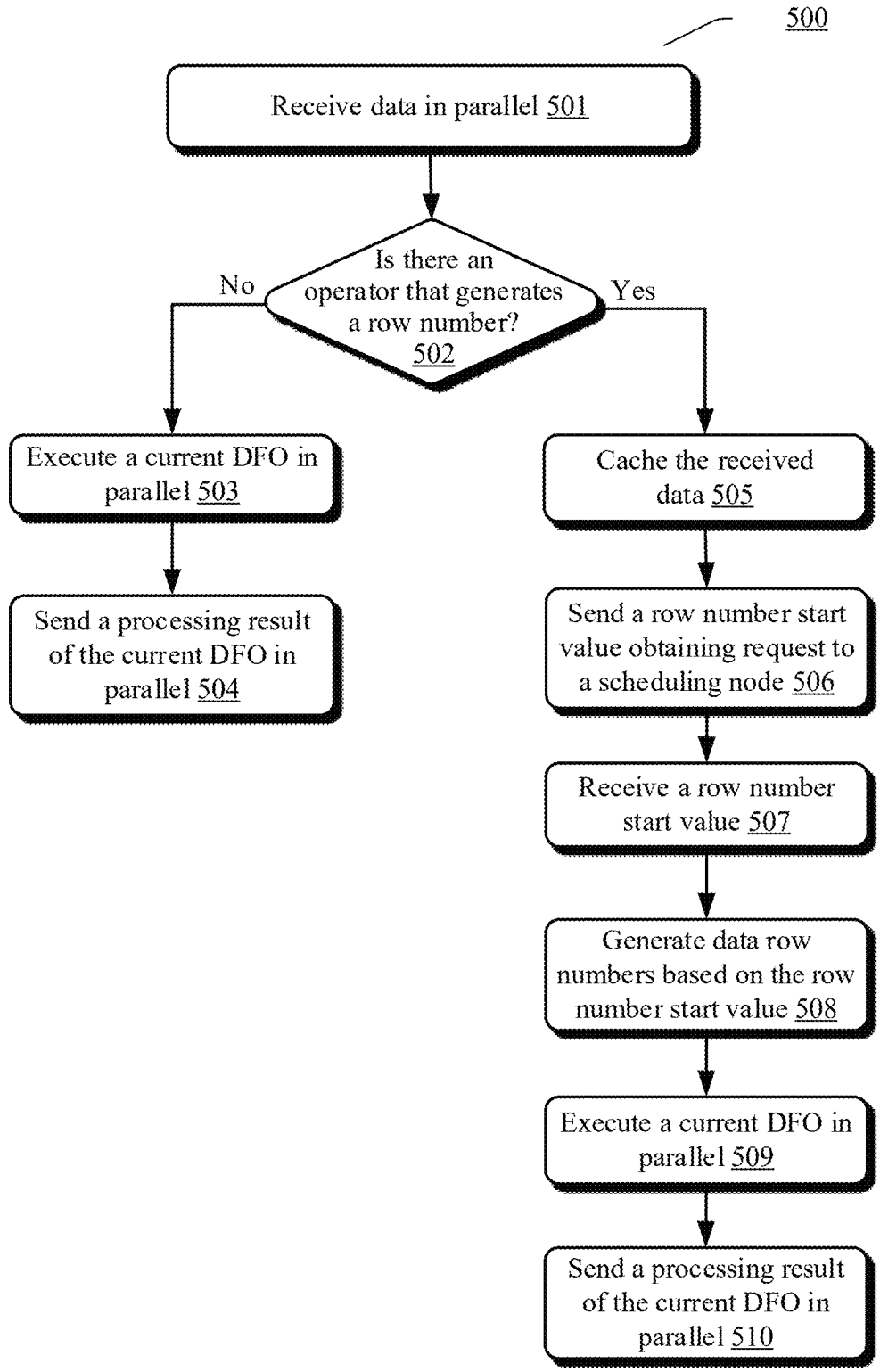
FIG. 5 is an example flowchart illustrating a plan execution method for a distributed database, according to an embodiment of this specification.

FIG. 5 is an example flowchart illustrating a plan execution method 500 for a distributed database, according to an embodiment of this specification. In the following descriptions, one execution thread enabled by a plan execution node is referred to as a first execution thread, and another execution thread that performs a current DFO with the first execution thread is referred to as a second execution thread. The second execution thread can include at least one execution thread. For example, the second execution thread can include an execution thread located on the same plan execution node as the first execution thread and/or an execution thread located on a different plan execution node from the first execution thread.

As shown in FIG. 5, in 501, the first execution thread receives, in parallel with all the second execution threads, feedback data returned by a child DFO of the current DFO. Here, the term "receiving in parallel" means that the first execution thread and the second execution thread simultaneously receive the feedback data returned by the child DFO. The term "feedback data" indicates data that need to be provided by the child DFO for a parent DFO, so that the data are used by the parent DFO for execution. In addition, optionally, in another example, when a storage node processes a plurality of DFOs in parallel, for example, when a data producer DFO for producing data and a data consumer DFO for consuming data exist on a storage node, the first execution thread receives, in parallel with all the second execution threads through streaming, the feedback data returned by the child DFO of the current DFO.

In 502, the first execution thread and all the second execution threads each determine whether the current DFO includes an execution operator related to a row number generation operation. For example, execution operators in the current DFO can be traversed, to determine whether the current DFO includes the execution operator related to the row number generation operation. For example, the execution operator related to the row number generation operation can include but is not limited to a COUNT operator or a SUM operator.

In response to that the current DFO does not include the execution operator related to the row number generation operation, in 503, the first execution thread performs the current DFO in parallel with all the second execution threads based on the respectively received data. Subsequently, in 504, the first execution thread sends, in parallel with all the second execution threads, a processing result of the current DFO to an execution thread scheduled to perform a parent DFO of the current DFO.

In response to that the current DFO includes the execution operator related to the row number generation operation, in 505, the first execution thread and all the second execution threads each cache the received data, and in 506, the first execution thread and all the second execution threads each send a row number start value obtaining request to a scheduling node. The row number start value obtaining request sent by each execution thread includes a quantity of rows of data cached by the execution thread.

In response to receiving the row number start value obtaining request sent by each execution thread, the scheduling node allocates progressively increasing row number start values to the first execution thread and all the second execution threads based on the quantity of rows of cached data in the received row number start value obtaining request. The allocated row number start values are allocated to the corresponding execution threads. In the allocated row number start values, a difference between two adjacent row number start values is not less than a quantity of rows of data cached by an execution thread corresponding to a prior row number start value. In an example, the difference between two adjacent row number start values may be equal to the quantity of rows of data cached by the execution thread corresponding to the prior row number start value. For example, it is assumed that there are two execution threads: a thread A and a thread B. If the thread A caches five rows of data and the thread B caches 10 rows of data, a row number start value allocated to the thread A is $M_A=0$, and a row number start value allocated to the thread B is $M_A=5$.

In 507, the first execution thread and all the second execution threads each receive, from the scheduling node, the row number start values returned in response to the row number start value obtaining request, and in 508, the first execution thread and all the second execution threads each generate data row numbers for the cached data based on the received row number start values.

After the data row numbers are generated for the cached data, in 509, the first execution thread performs, in parallel with all the second execution threads, the current DFO based on the respectively received data for which the data row numbers are generated, and in 510, the first execution thread sends, as feedback data in parallel with all the second execution threads, an execution result of the current DFO to the execution thread scheduled to perform the parent DFO of the current DFO. In this way, parallel execution processing for the current DFO is completed.

Figure 6:
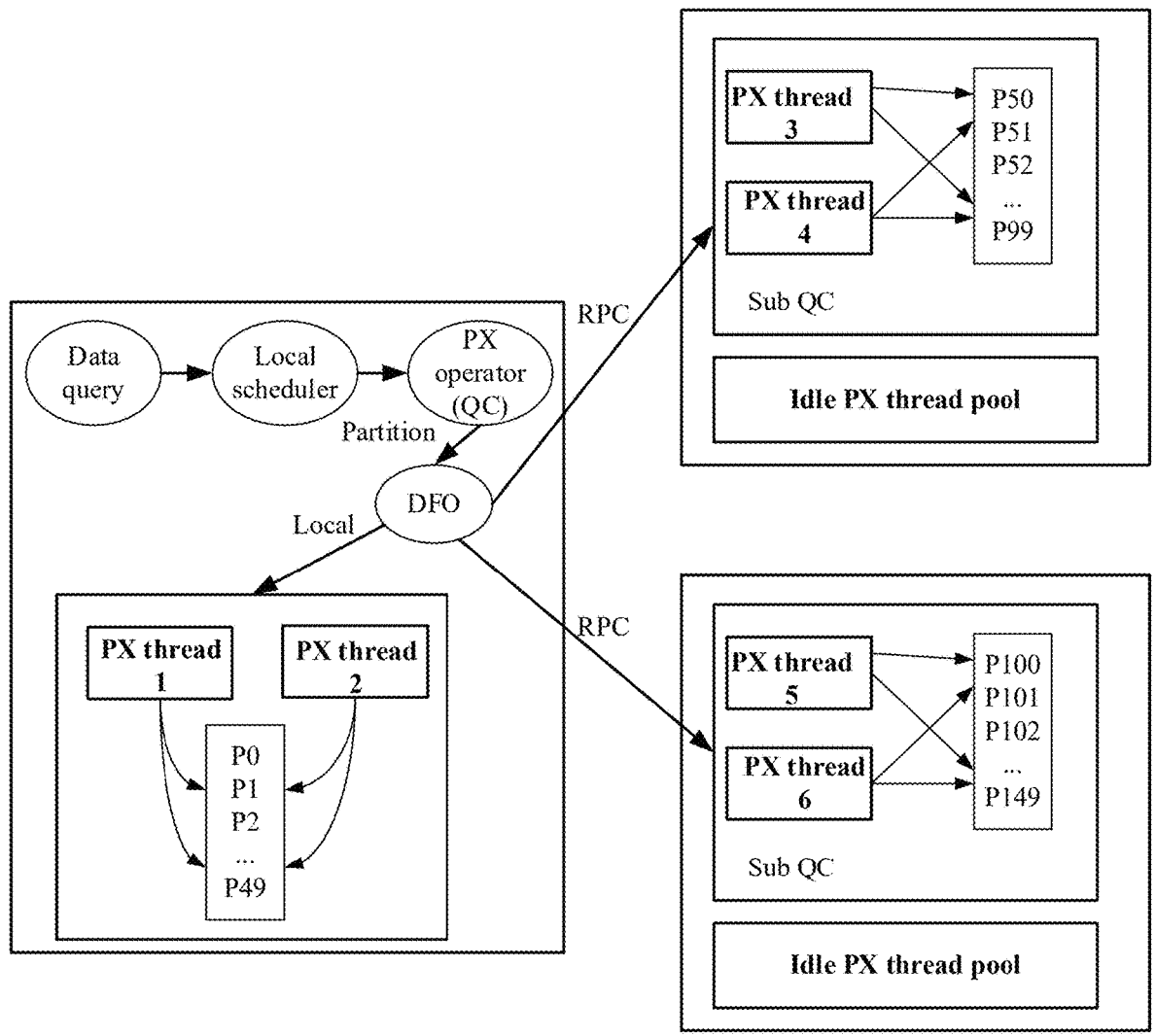
FIG. 6 is an example schematic diagram illustrating a data query process.

FIG. 6 is an example schematic diagram illustrating the data query process shown in FIG. 2. In an example in FIG. 6, during a data query, a PX operator in a distributed storage node that receives a data query statement initiated by a user serves as a query coordinator (QC). The distributed storage node reserves enough thread resources. When a distributed execution plan needs to be executed in parallel, the QC determines a degree of parallelism, and sends a worker thread obtaining request (QC request) to a sub query coordinator (SQC) on each distributed storage node. The SQC is a thread used to process the QC request on each distributed storage node. The SQC is responsible for applying for an execution resource, constructing an execution context environment, etc. for a DFO on the distributed storage node on which the SQC is located, and then schedules worker threads to perform the DFO in parallel on all storage nodes. As shown in FIG. 6, at each QC or SQC, a plurality of parallel scheduled execution threads compete for a task for execution from a scanning task queue.

As shown in FIG. 6, the QC distributes, to a proper storage node in an RPC manner, the DFO that needs to be performed in parallel. An SQC on a scheduled storage node schedules a PX thread to perform a received DFO. After the DFO on all the storage nodes are performed, an execution result is returned to a parent DFO through streaming.

Figure 7:
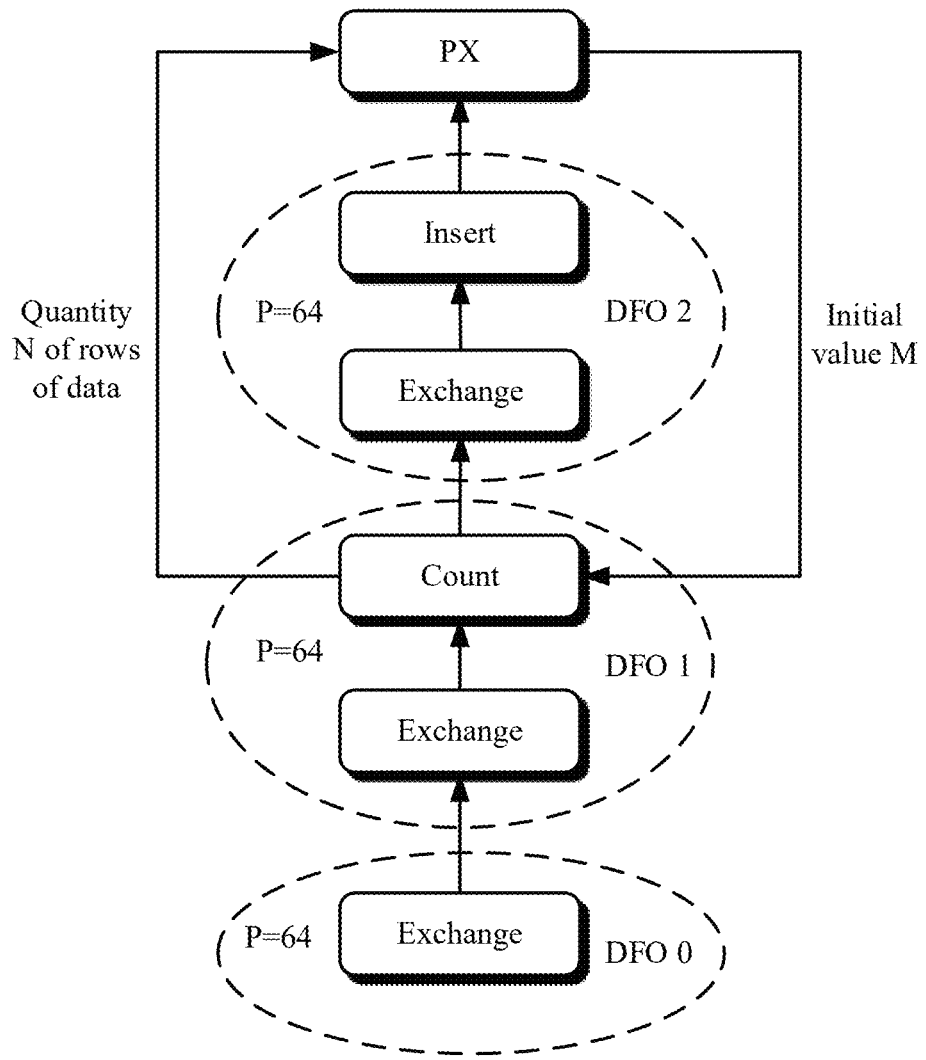
FIG. 7 is an example schematic diagram of a plan execution process of the distributed execution plan shown in FIG. 3.

The following describes a DFO execution process of the distributed execution plan shown in FIG. 3 with reference to FIG. 7. In the distributed execution plan shown in FIG. 3, a degree of thread parallelism is 64. In other words, 64 threads are simultaneously enabled to perform each DFO in parallel.

The distributed execution plan in FIG. 3 is used to implement parallel insertion of data of a table t1 into a table t2 and generation of a row number. The distributed execution plan in FIG. 3 is partitioned into three DFOs managed by one PX operator, namely, the DFO 0, the DFO 1, and the DFO 2 that are described above. When the DFOs are performed, the DFO 0 is performed, and then the DFO 1 and the DFO 2 are performed successively. An execution operator in the DFO 0 is a data scan operator (TABLE SCAN), and the data scan operator is not related to a data row number generation operation. Therefore, the 64 execution threads are enabled for parallel execution in a conventional plan execution method. Feedback data of the DFO 0 are provided for the DFO 1 in parallel. An execution operator of the DFO 1 is a COUNT operator, and the COUNT operator is related to the data row number generation operation. Therefore, the 64 execution threads are enabled for parallel execution in a parallel processing method in the embodiments of this specification. Feedback data of the DFO 1 are provided for the DFO 2 in parallel. An execution operator of the DFO 2 is a data insertion operator (INSERT), and the INSERT operator is not related to the data row number generation operation. Therefore, the 64 execution threads are enabled for parallel execution in the conventional plan execution method. In this way, the execution process of the distributed execution plan is completed.

In the above-mentioned DFO execution solution, once a DFO of an operation that data row numbers need to be generated for used data is encountered, a plurality of execution threads that perform the DFO in parallel send a row number start value obtaining request to a scheduling node, the scheduling node allocates different row number start values to all the execution threads, and all the execution threads generate data row numbers for locally received data based on the allocated row number start values, and then perform the DFO in parallel based on the data for which the data row numbers are generated. In this way, parallel execution performance of the distributed database is improved.

Figure 8:
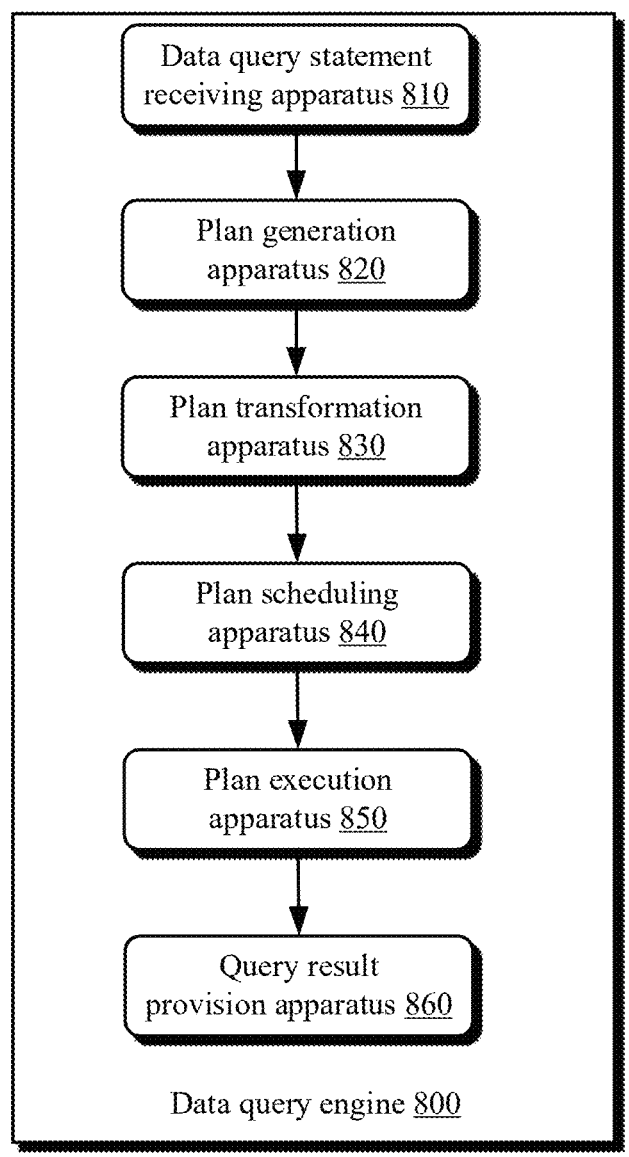
FIG. 8 is a schematic block diagram illustrating a data query engine on a distributed database, according to an embodiment of this specification.

FIG. 8 is an example block diagram illustrating a data query engine 800 according to an embodiment of this specification.

As shown in FIG. 8, the data query engine 800 includes a data query statement receiving apparatus 810, a plan generation apparatus 820, a plan transformation apparatus 830, a plan scheduling apparatus 840, a plan execution apparatus 850, and a query result provision apparatus 860.

The data query statement receiving apparatus 810 is configured to receive a data query statement. For example, in an example, the data query can be, for example, an SQL query, and the data query statement can include an SQL statement. For example, the received SQL statement can be, for example, "select t2.a, t2.b, (select sum (c) from t5 where t1.b=t5.a) as sum from t1, t2, t3, t4 where t1.a=1 and t1.b=t2.a and t1.b=t3.a and t1.b=t4.a". In an example, the data query statement receiving apparatus 810 can be implemented as an input interface, an input unit, or an input apparatus of the data query engine. For example, the data query statement receiving apparatus 810 can be an input box, etc. in a client interface of the data query engine.

The plan generation apparatus 820 is configured to generate a distributed execution plan based on the received data query statement. For example the plan generation apparatus 820 can include an optimizer, for example, an SQL optimizer. FIG. 3 is an example schematic diagram illustrating an SQL distributed execution plan.

The plan transformation apparatus 830 is configured to logically transform the distributed execution plan, to obtain a plurality of distributed logical subplans (DFOs). In an example, the plan transformation apparatus 830 can logically transform the distributed execution plan by using a data redistribution point as a boundary, to obtain the plurality of DFOs. In this specification, the term "data redistribution" indicates for example, a data distribution process in which data are redistributed from a storage node A to a storage node B. The data distribution process can be implemented by an operator (for example, an EXCHANGE OUT operator and an EXCHANGE IN operator) that is responsible for data sending and data receiving in the distributed execution plan. During partitioning into the DFOs, two DFOs are obtained through partitioning based on the EXCHANGE OUT operator and the EXCHANGE IN operator. One DFO is responsible for sending data after all execution operators of the DFO are executed, and the other DFO is responsible for executing all execution operators of the DFO after receiving data. In addition to an EXCHANGE operator, the data redistribution can be implemented by a PX COORD operator. The PX COORD operator is a special EXCHANGE IN operator. In addition to a data receiving function, the PX COORD operator has a function of scheduling a child DFO for execution.

The plan scheduling apparatus 840 is configured to successively schedule the plurality of DFOs to corresponding plan execution nodes in a scheduling sequence. In response to receiving the DFOs, plan execution apparatuses 850 on all the plan execution nodes start respective execution threads to execute the received DFOs in parallel. In response to that scheduling of the DFOs ends, the query result provision apparatus 860 provides an execution result of a top-level DFO for the user as a data query result.

Figure 9:
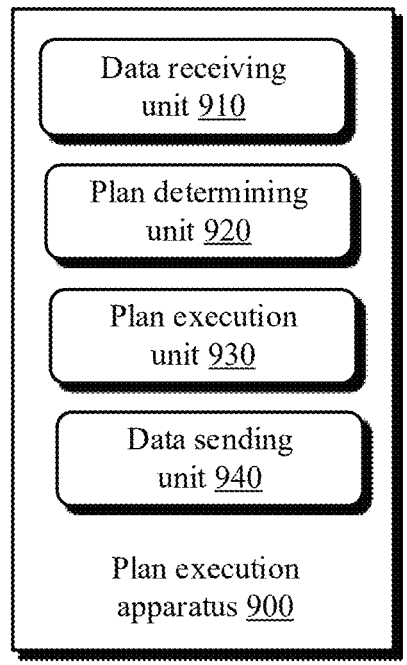
FIG. 9 is a schematic block diagram illustrating a plan execution apparatus of a distributed database, according to an embodiment of this specification.

FIG. 9 is a schematic block diagram illustrating a plan execution apparatus 900 of a distributed database, according to an embodiment of this specification. As shown in FIG. 9, the plan execution apparatus 900 includes a data receiving unit 910, a plan determining unit 920, a plan execution unit 930, and a data sending unit 940.

The data receiving unit 910 is configured to receive, in parallel through a first execution thread with at least one second execution thread scheduled to execute a current DFO, feedback data returned by a child DFO of the current DFO. For an operation of the data receiving unit 910, references can be made to the operation described above with reference to 501 in FIG. 5.

The plan determining unit 920 is configured to determine, through the first execution thread, whether the current DFO includes an execution operator related to a row number generation operation. For example, the plan determining unit 920 can traverse execution operators in the current DFO, to determine whether the current DFO includes the execution operator related to the row number generation operation. For an operation of the plan determining unit 920, references can be made to the operation described above with reference to 502 in FIG. 5.

The plan execution unit 930 is configured to: in response to that the current DFO includes the execution operator related to the row number generation operation, through the first execution thread, cache the received data, and send a row number start value obtaining request to a scheduling node, where the row number start value obtaining request includes a quantity of rows of cached data; generate data row numbers for the cached data based on a row number start value received from the scheduling node, where the row number start value is allocated by the scheduling node to the first execution thread in response to the row number start value obtaining request; and execute, in parallel through the first execution thread with the second execution thread, the current DFO based on the respectively received data for which the data row numbers are generated. The plan execution unit 930 executes the current DFO in parallel through the first execution thread with the second execution thread based on the respectively received data in response to that the current DFO does not include the execution operator related to the row number generation operation.

The data sending unit 940 is configured to send, as feedback data in parallel through the first execution thread with the second execution thread, an execution result of the current DFO to an execution thread scheduled to execute a parent DFO of the current DFO. For an operation of the data sending unit 940, references can be made to the operation described above with reference to 510 in FIG. 5.

Figure 10:
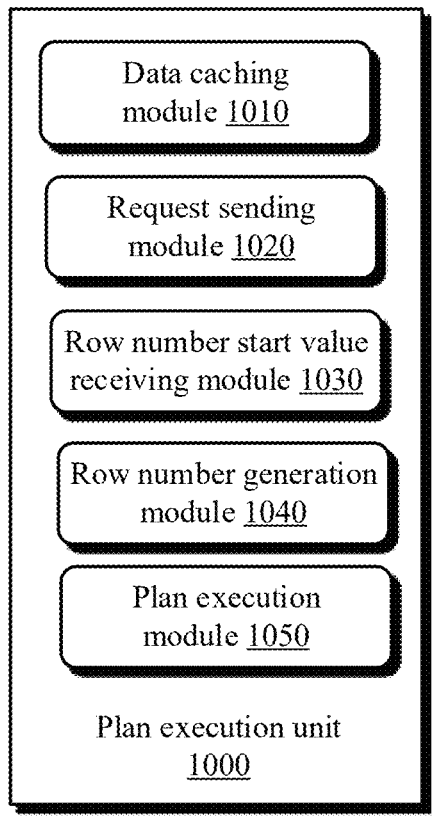
FIG. 10 is a schematic block diagram illustrating a plan execution unit, according to an embodiment of this specification.

FIG. 10 is a schematic block diagram illustrating a plan execution unit 1000, according to an embodiment of this specification. As shown in FIG. 10, the plan execution unit 1000 includes a data caching module 1010, a request sending module 1020, a row number start value receiving module 1030, a row number generation module 1040, and a plan execution module 1050.

The data caching module 1010 is configured to cache received data through a first execution thread in response to that a current DFO includes an execution operator related to a row number generation operation. For an operation of the data caching module 1010, references can be made to the operation described above with reference to 505 in FIG. 5.

The request sending module 1020 is configured to send a row number start value obtaining request to a scheduling node through the first execution thread. For an operation of the request sending module 1020, references can be made to the operation described above with reference to 506 in FIG. 5.

The row number start value receiving module 1030 is configured to receive a row number start value from the scheduling node through the first execution thread. For an operation of the row number start value receiving module 1030, references can be made to the operation described above with reference to 507 in FIG. 5.

The row number generation module 1040 is configured to generate data row numbers for the cached data based on the received row number start value through the first execution thread. For an operation of the row number generation module 1040, references can be made to the operation described above with reference to 508 in FIG. 5.

The plan execution module 1050 is configured to execute, in parallel through the first execution thread with the second execution thread, the current DFO based on the respectively received data for which the data row numbers are generated. For an operation of the plan execution module 1050, references can be made to the operation described above with reference to 509 in FIG. 5.

The plan execution method, the plan execution apparatus, the data query method, and the data query engine for a distributed database, and the distributed database according to an embodiment of this specification are described above with reference to FIG. 1 to FIG. 10. The plan execution apparatus and the data query engine can be implemented by using hardware, or can be implemented by using software or a combination of hardware and software.

Figure 11:
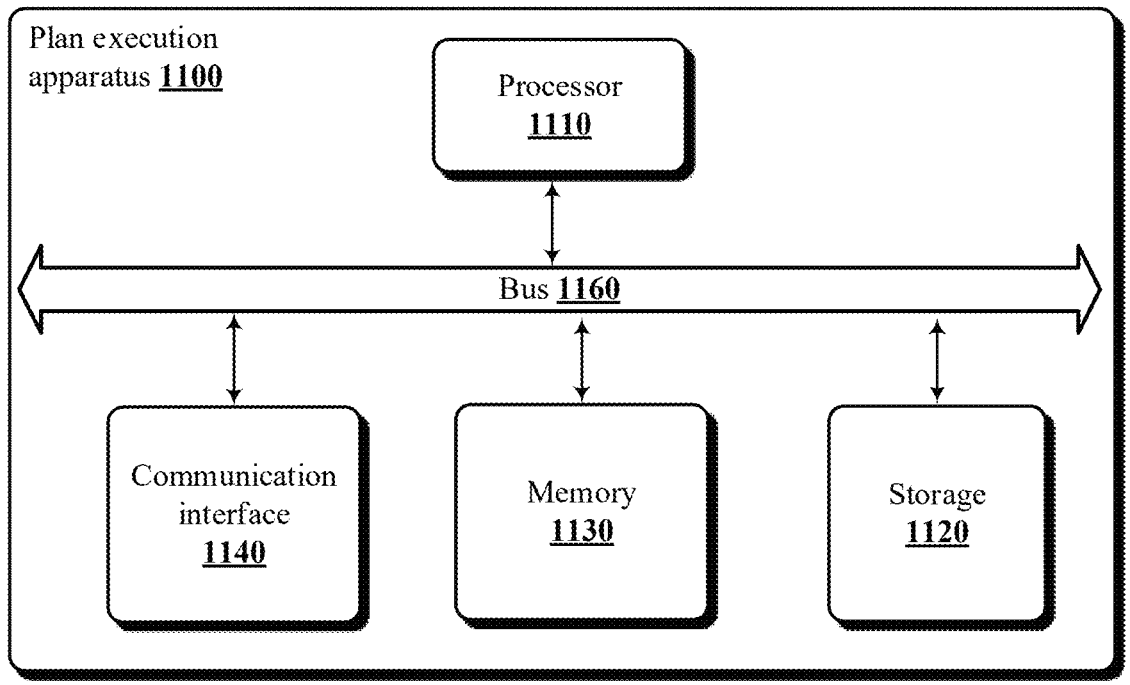
FIG. 11 is an example schematic diagram illustrating a plan execution apparatus implemented based on a computer system, according to an embodiment of this specification.

FIG. 11 is a schematic diagram illustrating a plan execution apparatus 1100 implemented based on a computer system, according to an embodiment of this specification. As shown in FIG. 11, the plan execution apparatus 1100 can include at least one processor 1110, a storage (for example, a nonvolatile memory) 1120, a memory 1130, and a communication interface 1140, and the at least one processor 1110, the storage 1120, the memory 1130, and the communication interface 1140 are connected together through a bus 1160. The at least one processor 1110 executes at least one computer-readable instruction (namely, the above-mentioned element implemented in a software form) stored or encoded in the storage.

In an embodiment, the storage stores computer-executable instructions, and when the computer-executable instructions are executed, the at least one processor 1110 is enabled to perform the following operations: receiving, in parallel with at least one second execution thread scheduled to execute a current logical subplan, feedback data returned by a child logical subplan of the current logical subplan; determining whether the current logical subplan includes an execution operator related to a row number generation operation; in response to that the current logical subplan includes the execution operator related to the row number generation operation, caching the received data, and sending a row number start value obtaining request to a scheduling node, where the row number start value obtaining request includes a quantity of rows of cached data; generating data row numbers for the cached data based on a row number start value received from the scheduling node, where the row number start value is allocated by the scheduling node to the first execution thread in response to the row number start value obtaining request; and executing, in parallel with the second execution thread, the current logical subplan based on the respectively received data for which the data row numbers are generated; and sending, as feedback data in parallel with the second execution thread, an execution result of the current logical subplan to an execution thread scheduled to execute a parent logical subplan of the current logical subplan.

It should be understood that, when the computer-executable instructions stored in the storage are executed, the at least one processor 1110 is enabled to perform the above-mentioned operations and functions described with reference to FIG. 1 to FIG. 10 in the embodiments of this specification.

Figure 12:
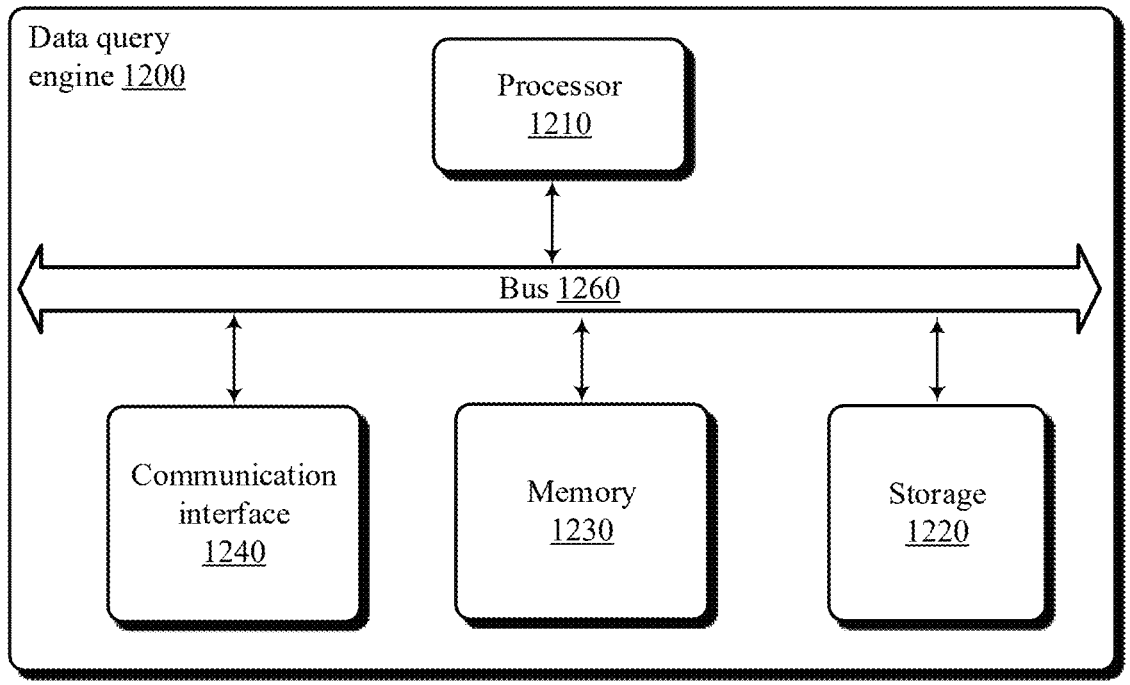
FIG. 12 is an example schematic diagram illustrating a data query engine implemented based on a computer system, according to an embodiment of this specification.

FIG. 12 is a schematic diagram illustrating a data query engine 1200 implemented based on a computer system, according to an embodiment of this specification. As shown in FIG. 12, the data query engine 1200 can include at least one processor 1210, a storage (for example, a nonvolatile memory) 1220, a memory 1230, and a communication interface 1240, and the at least one processor 1210, the storage 1220, the memory 1230, and the communication interface 1240 are connected together through a bus 1260. The at least one processor 1210 executes at least one computer-readable instruction (namely, the above-mentioned elements implemented in a software form) stored or encoded in the storage.

In an embodiment, computer-executable instructions are stored in the storage, and when the computer-executable instructions are executed, the at least one processor 1210 is enabled to perform the following operations: receiving a data query statement provided by a user; generating a distributed execution plan based on the received data query statement; logically transforming the distributed execution plan, to obtain a plurality of distributed logical subplans, where the plurality of distributed logical subplans are formed into a tree structure; successively scheduling the plurality of distributed logical subplans to corresponding distributed data storage nodes in a scheduling sequence, to perform parallel execution in the method described above; and providing an execution result of a top-level distributed logical subplan for the user as a data query result.

It should be understood that, when the computer-executable instructions stored in the storage are executed, the at least one processor 1210 is enabled to perform the above-mentioned operations and functions described with reference to FIG. 1 to FIG. 10 in the embodiments of this specification.

According to one or more embodiments, a program product such as a machine-readable medium (for example, a non-transient machine-readable medium) is provided. The machine-readable medium can have instructions (namely, the above-mentioned elements implemented in a software form). When the instructions are executed by a machine, the machine is enabled to perform various operations and functions described above with reference to FIG. 1 to FIG. 10 in the embodiments of this specification. Specifically, a system or an apparatus equipped with a readable storage medium can be provided, and software program code for implementing the functions in any of the above-mentioned embodiments is stored in the readable storage medium, so that a computer or a processor of the system or the apparatus reads and executes instructions stored in the readable storage medium.

In this case, the program code read from the readable medium can implement the functions in any one of the above-mentioned embodiments, and therefore, the machine-readable code and the readable storage medium storing the machine-readable code form a part of this disclosure.

Embodiments of the readable storage medium include a floppy disk, a hard disk, a magneto-optical disc, an optical disc (for example, a CD-ROM, a CD-R, a CD-RW, a DVD-ROM, a DVD-RAM, a DVD-RW, and a DVD-RW), a magnetic tape, a nonvolatile storage card, and a ROM. Alternatively, program code can be downloaded from a server computer or cloud through a communication network.

According to an embodiment, a computer program product is provided. The computer program product includes a computer program, and when the computer program is executed by a processor, the processor is enabled to perform the above-mentioned operations and functions described with reference to FIG. 1 to FIG. 10 in the embodiments of this specification.

A person skilled in the art should understand that various variations and modifications can be made to the embodiments disclosed above without departing from the essence of the present invention. Therefore, the protection scope of this disclosure shall be subject to the appended claims.

It should be noted that, not all steps and units in the previous processes and system structure diagrams are necessary. Some steps or units can be ignored based on actual requirements. An execution sequence of each step is not fixed, and can be determined based on needs. The apparatus structure described in the above-mentioned embodiments can be a physical structure, or can be a logical structure. In other words, some units may be implemented by the same physical entity, or some units may be implemented by a plurality of physical entities or implemented jointly by some components in a plurality of independent devices.

In the above-mentioned embodiments, the hardware unit or module can be implemented in a mechanical manner or an electrical manner. For example, a hardware unit, a module, or a processor can include a dedicated permanent circuit or logic (for example, a dedicated processor, an FPGA, or an ASIC) to complete a corresponding operation. The hardware unit or the processor can further include programmable logic or circuits (for example, a general-purpose processor or another programmable processor), and can be temporarily disposed by the software, to complete a corresponding operation. A specific implementation (a mechanical manner, a dedicated permanent circuit, or a temporarily disposed circuit) can be determined in consideration of costs and time.

The specific implementations illustrated above with reference to the accompanying drawings describe example embodiments, but do not represent all embodiments that can be implemented or fall within the protection scope of the claims. The term "example" used throughout this specification means "used as an example, an instance, or an illustration" and does not mean "preferred" or "advantageous" over other embodiments. For the purpose of providing an understanding of the described technology, the specific implementations include specific details. However, these techniques can be implemented without these specific details. In some instances, well-known structures and apparatuses are shown in block diagram forms, to avoid difficulty in understanding the concept in the described embodiments.

The above-mentioned descriptions of content of this disclosure are provided to enable any person of ordinary skill in the art to implement or use the content of this disclosure. Various modifications made to the present disclosure are clear to a person of ordinary skill in the art, and the general principles defined in this specification can also be applied to other variants without departing from the protection scope of the present disclosure. Therefore, the content of the present disclosure is not limited to the examples and designs described in this specification, but is consistent with the widest range of principles and novelty features that conform to this specification.

What is claimed is:

1. A logical subplan execution method for a distributed database, wherein the method is performed by a first execution thread on a plan execution node, and the method comprises:

receiving, in parallel with at least one second execution thread scheduled to execute a current logical subplan, feedback data returned by a child logical subplan of the current logical subplan;

determining whether the current logical subplan comprises an execution operator related to a row number generation operation;

in response to that the current logical subplan comprises the execution operator related to the row number generation operation, performing the following operations:

caching the received data, and sending a row number start value obtaining request to a scheduling node, wherein the row number start value obtaining request comprises a quantity of rows of cached data;

generating data row numbers for the cached data based on a row number start value received from the scheduling node, wherein the row number start value is allocated by the scheduling node to the first execution thread in response to the row number start value obtaining request; and executing, in parallel with the second execution thread, the current logical subplan based on the respectively received data for which the data row numbers are generated; and sending, as feedback data in parallel with the second execution thread, an execution result of the current logical subplan to an execution thread scheduled to execute a parent logical subplan of the current logical subplan.

2. The method according to claim 1, further comprising: executing the current logical subplan in parallel with the second execution thread based on the respectively received data in response to that the current logical subplan does not comprise the execution operator related to the row number generation operation.

3. The method according to claim 1, wherein the determining whether the current logical subplan comprises an execution operator related to a row number generation operation comprises:

traversing execution operators in the current logical subplan, to determine whether the current logical subplan comprises the execution operator related to the row number generation operation.

4. The method according to claim 1, wherein the scheduling node allocates progressively increasing row number start values to the first execution thread and all the second execution threads based on the quantity of rows of cached data in the row number start value obtaining request received from the first execution thread and the second execution thread.

5. The method according to claim 1, wherein the second execution thread comprises an execution thread located on the same plan execution node as the first execution thread and/or an execution thread located on a different plan execution node from the first execution thread.

6. The method according to claim 5, wherein a quantity of execution threads on each plan execution node is determined based on a data correlation between data stored on the plan execution node and the current logical subplan and an idle thread resource on the plan execution node.

7. A data query method for a distributed database, wherein the method is performed by a first execution thread on a plan execution node, comprising:

receiving a data query statement provided by a user;

generating a distributed execution plan based on the received data query statement;

logically transforming the distributed execution plan, to obtain a plurality of distributed logical subplans, wherein the plurality of distributed logical subplans are formed into a tree structure;

successively scheduling the plurality of distributed logical subplans to corresponding distributed data storage nodes in a scheduling sequence;

receiving, in parallel with at least one second execution thread scheduled to execute a current logical subplan, feedback data returned by a child logical subplan of the current logical subplan;

determining whether the current logical subplan comprises an execution operator related to a row number generation operation;

in response to that the current logical subplan comprises the execution operator related to the row number generation operation, performing the following operations:

caching the received data, and sending a row number start value obtaining request to a scheduling node, wherein the row number start value obtaining request comprises a quantity of rows of cached data;

generating data row numbers for the cached data based on a row number start value received from the scheduling node, wherein the row number start value is allocated by the scheduling node to the first execution thread in response to the row number start value obtaining request; and executing, in parallel with the second execution thread, the current logical subplan based on the respectively received data for which the data row numbers are generated; and sending, as feedback data in parallel with the second execution thread, an execution result of the current logical subplan to an execution thread scheduled to execute a parent logical subplan of the current logical subplan; and providing an execution result of a top-level distributed logical subplan for the user as a data query result.

8. The method according to claim 7, wherein the scheduling sequence of the distributed logical subplans is determined based on a tree structure of the distributed logical subplans.

9. A non-transitory computer-readable storage medium, wherein the computer-readable storage medium stores executable instructions, and when the instructions are executed, a processor is enabled to perform a logical subplan execution method for a distributed database, wherein the method is performed by a first execution thread on a plan execution node, and the method comprises:

receiving, in parallel with at least one second execution thread scheduled to execute a current logical subplan, feedback data returned by a child logical subplan of the current logical subplan;

determining whether the current logical subplan comprises an execution operator related to a row number generation operation;

in response to that the current logical subplan comprises the execution operator related to the row number generation operation, performing the following operations:

caching the received data, and sending a row number start value obtaining request to a scheduling node, wherein the row number start value obtaining request comprises a quantity of rows of cached data;

generating data row numbers for the cached data based on a row number start value received from the scheduling node, wherein the row number start value is allocated by the scheduling node to the first execution thread in response to the row number start value obtaining request; and executing, in parallel with the second execution thread, the current logical subplan based on the respectively received data for which the data row numbers are generated; and sending, as feedback data in parallel with the second execution thread, an execution result of the current logical subplan to an execution thread scheduled to execute a parent logical subplan of the current logical subplan.

10. The non-transitory computer-readable storage medium according to claim 9, wherein the non-transitory computer-readable storage medium is further caused to:

execute the current logical subplan in parallel with the second execution thread based on the respectively received data in response to that the current logical subplan does not comprise the execution operator related to the row number generation operation.

11. The non-transitory computer-readable storage medium according to claim 9, wherein the non-transitory computer-readable storage medium being caused to determining whether the current logical subplan comprises an execution operator related to a row number generation operation includes being caused to:
   traversing execution operators in the current logical subplan, to determine whether the current logical subplan comprises the execution operator related to the row number generation operation.

12. The non-transitory computer-readable storage medium according to claim 9, wherein the scheduling node allocates progressively increasing row number start values to the first execution thread and all the second execution threads based on the quantity of rows of cached data in the row number start value obtaining request received from the first execution thread and the second execution thread.

13. The non-transitory computer-readable storage medium according to claim 9, wherein the second execution thread comprises an execution thread located on the same plan execution node as the first execution thread and/or an execution thread located on a different plan execution node from the first execution thread.

14. The non-transitory computer-readable storage medium according to claim 12, wherein a quantity of execution threads on each plan execution node is determined based on a data correlation between data stored on the plan execution node and the current logical subplan and an idle thread resource on the plan execution node.

15. The non-transitory computer-readable storage medium according to claim 9, wherein the processor is enabled to perform a data query method for a distributed database, and the method comprises:
   receiving a data query statement provided by a user;
   generating a distributed execution plan based on the received data query statement;
   logically transforming the distributed execution plan, to obtain a plurality of distributed logical subplans, wherein the plurality of distributed logical subplans are formed into a tree structure;
   successively scheduling the plurality of distributed logical subplans to corresponding distributed data storage nodes in a scheduling sequence, to perform parallel execution according to a logical subplan execution method for a distributed database, wherein the method is performed by a first execution thread on a plan execution node; and
   providing an execution result of a top-level distributed logical subplan for the user as a data query result.

16. The non-transitory computer-readable storage medium according to claim 14, wherein the scheduling sequence of the distributed logical subplans is determined based on a tree structure of the distributed logical subplans.

* * * * *